United States Patent [19]
Hong et al.

[11] Patent Number: 5,999,381
[45] Date of Patent: Dec. 7, 1999

[54] HEAD DRUM ASSEMBLY WITH VIBRATION ABSORBING ELEMENT

[75] Inventors: Hyun-soo Hong; Seung-Woo Lee, both of Suwon, Rep. of Korea

[73] Assignee: Samsung Electronics Co., Ltd., Rep. of Korea

[21] Appl. No.: 09/032,570

[22] Filed: Feb. 27, 1998

[30] Foreign Application Priority Data

Mar. 8, 1997 [KR] Rep. of Korea ................. 97/7827

[51] Int. Cl.⁶ ............................................. G11B 15/61
[52] U.S. Cl. ............................. 360/130.24; 360/130.32
[58] Field of Search ................. 360/107, 84, 130.22, 360/130.23, 130.24, 130.31, 130.32

[56] References Cited

U.S. PATENT DOCUMENTS

| | | | |
|---|---|---|---|
| 4,048,661 | 9/1977 | Staar | 360/130.24 |
| 5,212,613 | 5/1993 | Seo | 360/130.24 |
| 5,220,475 | 6/1993 | Fujiki et al. | 360/130.24 |
| 5,452,169 | 9/1995 | Joh et al. | 360/130.24 |
| 5,502,607 | 3/1996 | Ushiro et al. | 360/130.24 |
| 5,526,207 | 6/1996 | Sawada et al. | 360/130.24 |

FOREIGN PATENT DOCUMENTS

| | | |
|---|---|---|
| 58-6547 | 1/1983 | Japan . |
| 2-203459 | 8/1990 | Japan . |
| 4-252412 | 9/1992 | Japan . |
| 4-252454 | 9/1992 | Japan . |
| 6-20350 | 1/1994 | Japan . |
| 7-65333 | 3/1995 | Japan . |

*Primary Examiner*—Craig A. Renner
*Attorney, Agent, or Firm*—Dilworth & Barrese

[57] ABSTRACT

A head drum assembly for a tape recorder includes a stationary drum, a rotary drum, a magnetic head installed in the rotary drum for scanning a traveling magnetic tape, and at least one vibration absorbing unit installed in the stationary drum for absorbing vibrations associated with the traveling magnetic tape. The head drum assembly absorbs vibrations via a vibration absorbing element elastically biased to protrude toward the outer circumferential surface of the stationary drum by a spring installed in an opening of a portion of the stationary drum such that the vibration absorbing element makes contact with the magnetic tape. As the vibration absorbing element makes contact with the traveling magnetic tape, it gives appropriate tension to the magnetic tape to dampen any vibration created therefrom.

11 Claims, 4 Drawing Sheets

HEAD DRUM ASSEMBLY WITH VIBRATION ABSORBING ELEMENT

BACKGROUND OF THE INVENTION

1. Field of the Invention

The present invention relates to a head drum assembly for a tape recorder, and more particularly, to a head drum assembly which rotates at a high speed for recording information on and reproducing information from a magnetic tape by a magnetic head in a tape recorder such as a VCR.

2. Description of the Related Art

Referring to FIGS. 1 and 2, a conventional head drum assembly 100 includes a rotary drum 120 rotatably supported by a rotation shaft 110, a stationary drum 130 installed in the lower portion of the rotary drum 120 to be fixed to a main base (not shown), a stator core 140 installed in the lower portion of the stationary drum 130 and around which a coil 141 is wound, and a rotor 150 having a magnet 151 facing the stator core 140 on its inner circumferential surface.

A magnetic head 121 is installed in the rotary drum 120. Also, the rotation shaft 1 10 is rotatably supported on the stationary drum 130 by a bearing 111.

A magnetic tape 10 is drawn out from a tape cassette (not shown) by a pair of pole bases 11 and travels in a manner such that the magnetic tape 10 is in contact with the head drum. Here, the magnetic tape 10 travels, with the lower end thereof being guided by a circumferential guide step 131 formed on the outer circumferential surface of the stationary drum 130.

Also, while the rotary drum 120 rotates at a high speed, information is recorded on and reproduced from the traveling magnetic tape 10.

When the tape recorder operates, vibrations are generated due to the high-speed rotation of the rotary drum 120 effecting contact between magnetic tape 10 and magnetic head 121. Such vibrations may cause problems such as screen flickering, noise, and wear of the magnetic head or the like in a tape recorder.

SUMMARY OF THE INVENTION

To solve the above problems, it is an object of the present invention to provide a rotary head drum assembly having a device for absorbing vibrations of a magnetic tape while scanning the magnetic tape.

To accomplish an object of the present invention, there is provided a head drum assembly for a tape recorder comprising a stationary drum fixed on a main base, a rotary drum combined with a rotation shaft rotatably supported by the stationary drum, a magnetic head installed in the rotary drum for scanning a traveling magnetic tape, and a vibration absorbing unit installed in the stationary drum, for absorbing vibrations by being in contact with the traveling magnetic tape.

Here, the vibration absorbing unit comprises an elastic body installed in an opening formed in the stationary drum, and a vibration absorbing element elastically biased in an outward radial direction of the stationary drum by the elastic body, and being in contact with the traveling magnetic tape.

Preferably, the contact surface of the vibration absorbing member in contact with the magnetic tape is rounded.

Also, the vibration absorbing element is preferably formed of a rubber or synthetic resin.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF PREFERRED EMBODIMENTS

Figure 1:
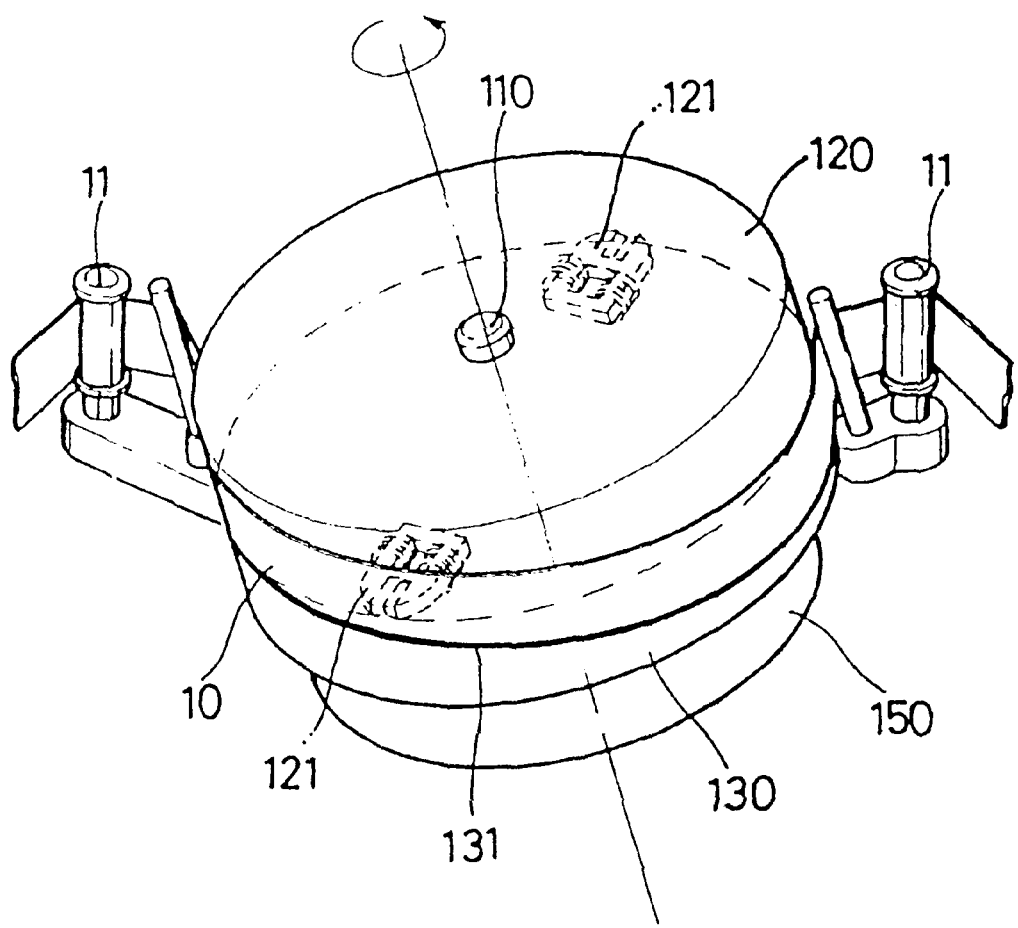
FIG. 1 is a schematic perspective view of a conventional head drum assembly for a tape recorder.
Figure 2:
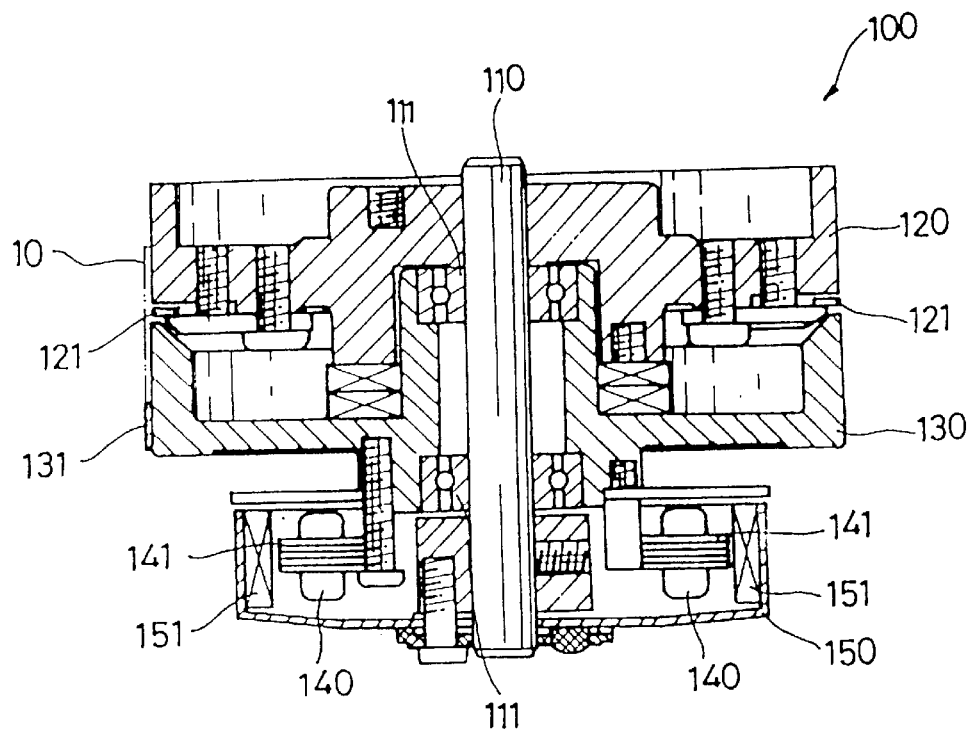
FIG. 2 is a schematic cross-sectional view of the head drum assembly shown in FIG. 1.
Figure 4:
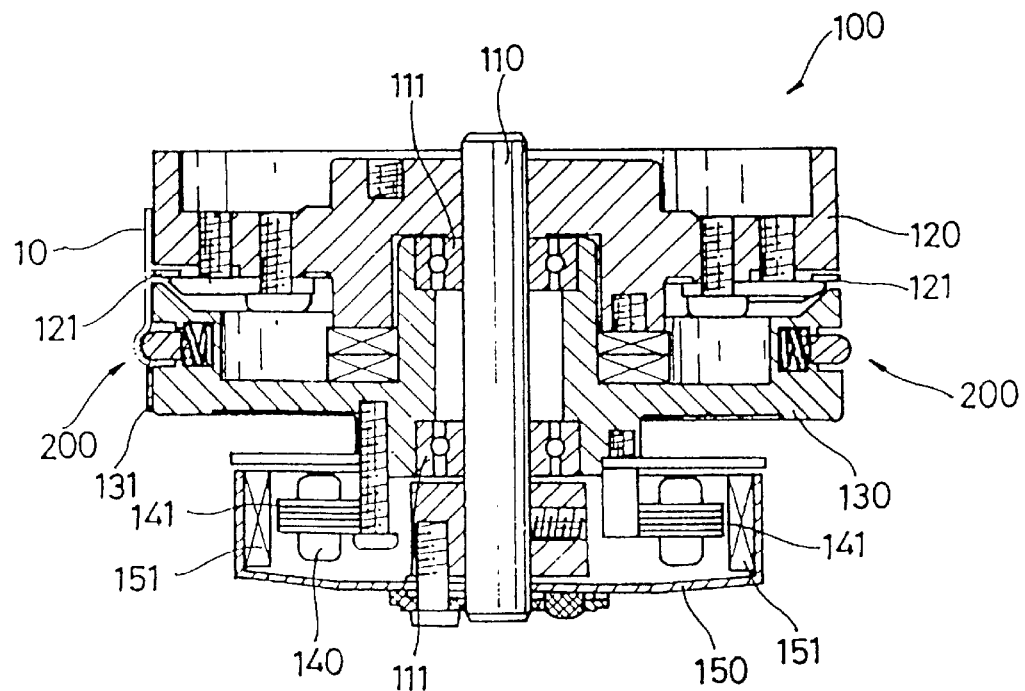
FIG. 4 is a schematic cross-sectional view of the head drum assembly shown in FIG. 3.
Figure 3:
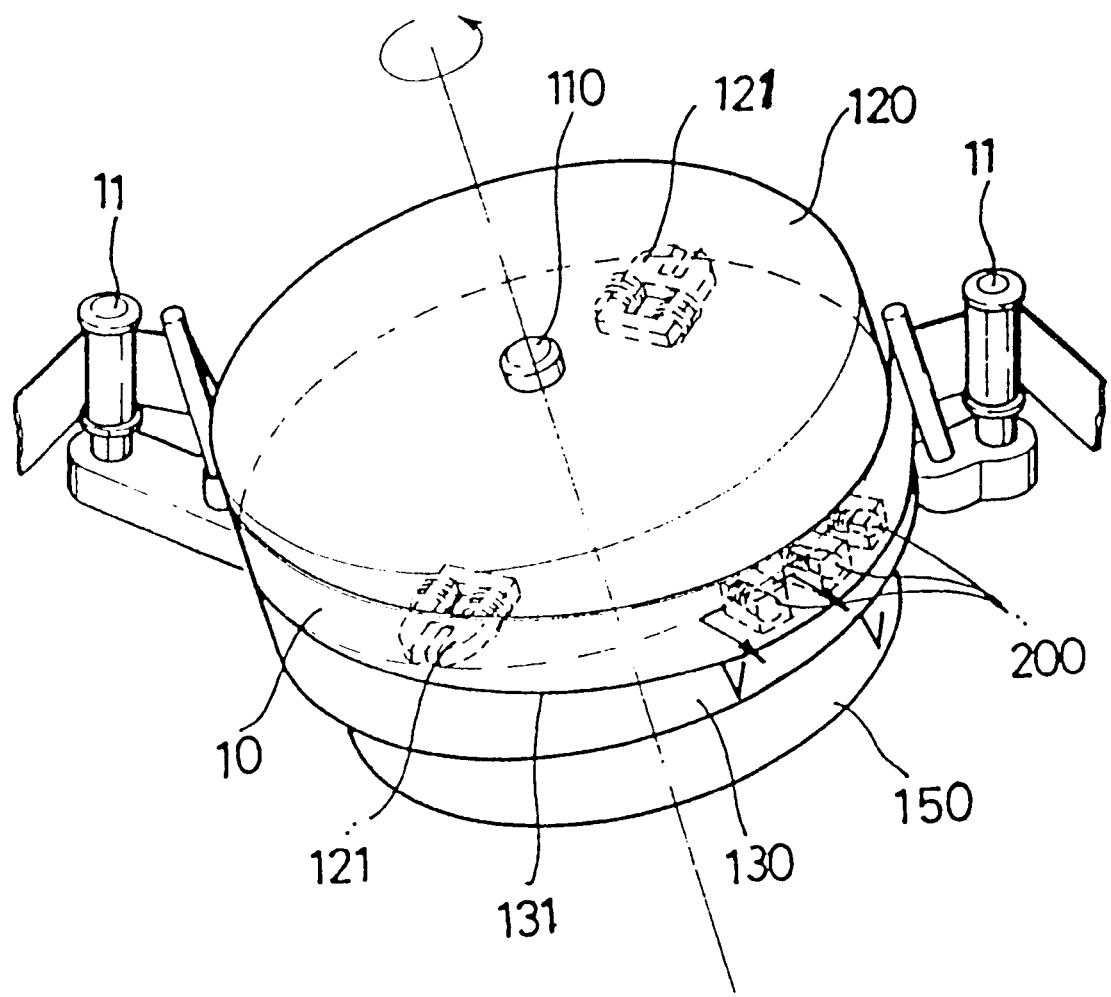
FIG. 3 is a schematic perspective view of a head drum assembly for a tape recorder according to an embodiment of the present invention.

Hereinbelow, preferred embodiments of the present invention will be described in detail with reference to FIGS. 3 through 5. Throughout the drawings, the same reference numerals represent the same elements. Head drum assembly 100 includes a rotary drum 120, a stationary drum 130, a stator core 140 and a rotor 150. A magnetic head 121 is installed in rotary drum 120 which is rotatably supported by a rotation shaft 110. Stationary drum 130 is installed and configured to be fixed to a main base (not shown) in the lower portion of the rotary drum 120.

According to the present invention, at least one vibration absorbing unit 200 configured and dimensioned to be in contact with the magnetic tape 10, for absorbing the vibration thereof, is installed in the stationary drum 130. Preferably, at least two vibration absorbing units 200 are installed in the stationary drum 130 to dampen vibrations of magnetic tape 10.

Figure 5:
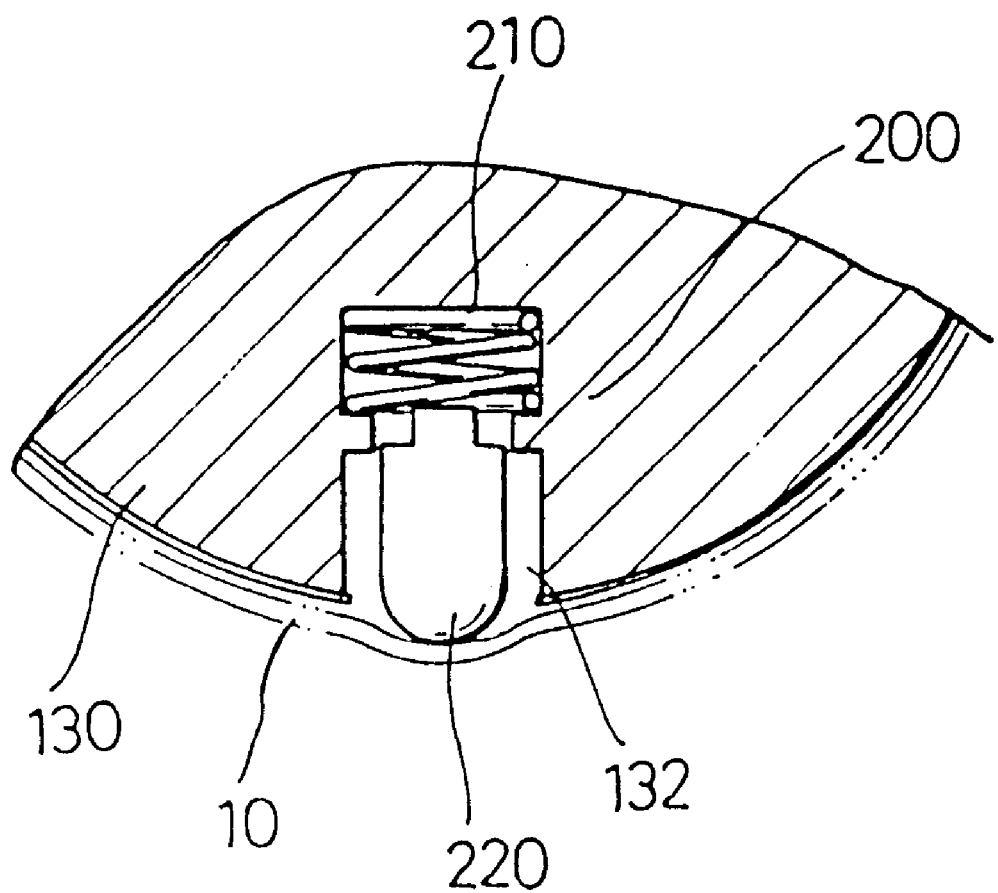
FIG. 5 is an exploded cross-sectional view of a vibration absorbing unit in accordance with the present invention.

Referring now to FIG. 5, vibration absorbing unit 200 includes an elastic body such as a coil spring 210 installed in an opening 132 formed in the stationary drum 130, and a vibration absorbing element 220 which is elastically biased in an outward radial direction of the stationary drum 130 by the coil spring 210 such that it is in contact with the traveling magnetic tape 10.

Preferably, the vibration absorbing element 220 is formed of rubber or synthetic resin. Also, the surface of the vibration absorbing element 220 which contacts magnetic tape 10 is rounded to have a predetermined curvature. The curvature may differ depending on characteristics of the vibration absorbing element 220.

The elastic force of the coil spring 210 is less than the tension of the magnetic tape 10. Thus, when the magnetic tape 10 contacts the vibration absorbing element 220, it is preferred that the vibration absorbing element 220 is pressed slightly inwardly from its initial position by the tension of the magnetic tape 10.

Referring again to FIG. 3, during the operation of the head drum assembly according to the present invention, having the aforementioned configuration, the magnetic tape 10 is drawn out from a tape cassette (not shown) by a pair of pole bases 11 and travels in a manner in which the tape is in contact with the rotary drum 120 and the stationary drum 130. The traveling of the magnetic tape 10 is guided by the stepped guide groove 131 formed on the outer circumferential surface of the stationary drum 130.

Since the vibration absorbing element 220 is elastically biased in an outward radial direction of the stationary drum 130 by the coil spring 210, it gives appropriate tension to the traveling magnetic tape 10 by being in contact therewith, thereby absorbing the vibration generated due to the high-speed rotation of the rotary drum 120 and the contact of the magnetic tape 10 with the magnetic head 121.

Therefore, the precision of the magnetic head for signal pick-up is improved so that screen flickering or noise is suppressed, thereby improving the operational characteristics of a tape recorder.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A head drum assembly for a tape recorder comprising:

a stationary drum;

a rotary drum combined with a rotation shaft rotatably supported by the stationary drum;

a magnetic head installed in the rotary drum, the magnetic head being positioned to scan a magnetic tape; and at least one vibration absorbing unit supported by the stationary drum, the at least one vibration absorbing unit being positioned to absorb vibrations associated with the magnetic tape and including a coil spring and a vibration absorbing element, the coil spring exerting a force in a substantially outward radial direction of the stationary drum on the vibration absorbing element to urge the vibration absorbing element into the magnetic tape.

2. The head drum assembly according to claim 1, wherein the vibration absorbing element includes a body installed in an opening formed in the stationary drum and the vibration absorbing element is elastically biased in an outward radial direction of the stationary drum by the coil spring, the vibration absorbing element having a contact surface in contact with the magnetic tape.

3. The head drum assembly according to claim 2, wherein the contact surface of the vibration absorbing element is rounded.

4. The head drum assembly according to claim 2, wherein the vibration absorbing element is formed of a rubber.

5. The head drum assembly according to claim 2, wherein the vibration absorbing element is formed of a synthetic resin.

6. The head drum assembly according to claim 1, wherein an elastic force of the coil spring is less than a tension of the magnetic tape.

7. The head drum assembly according to claim 1, wherein the at least one vibration absorbing element comprises three vibration absorbing units installed in the stationary drum.

8. The head drum assembly according to claim 1, wherein the stationary drum has a circumferential step formed on an outer periphery thereof for guiding the magnetic tape.

9. The head drum assembly according to claim 1, further comprising a stator core having a coil supported thereon coupled to the stationary drum, and a rotor and a magnet coupled to the rotary drum.

10. The head drum assembly according to claim 1, further comprising means for drawing the magnetic tape form a tape cassette to cause the magnetic tape to travel along a predetermined path which is in contact with at least one of the stationary drum and the rotary drum.

11. The head drum assembly according to claim 10, wherein the means for drawing the magnetic tape from a tape cassette is a pair of pole bases.

\* \* \* \* \*